Dec. 29, 1959 P. S. SMITH 2,918,842
IMAGE-PRODUCING LENS SYSTEM AND CONTROL
Filed June 12, 1956 4 Sheets-Sheet 1
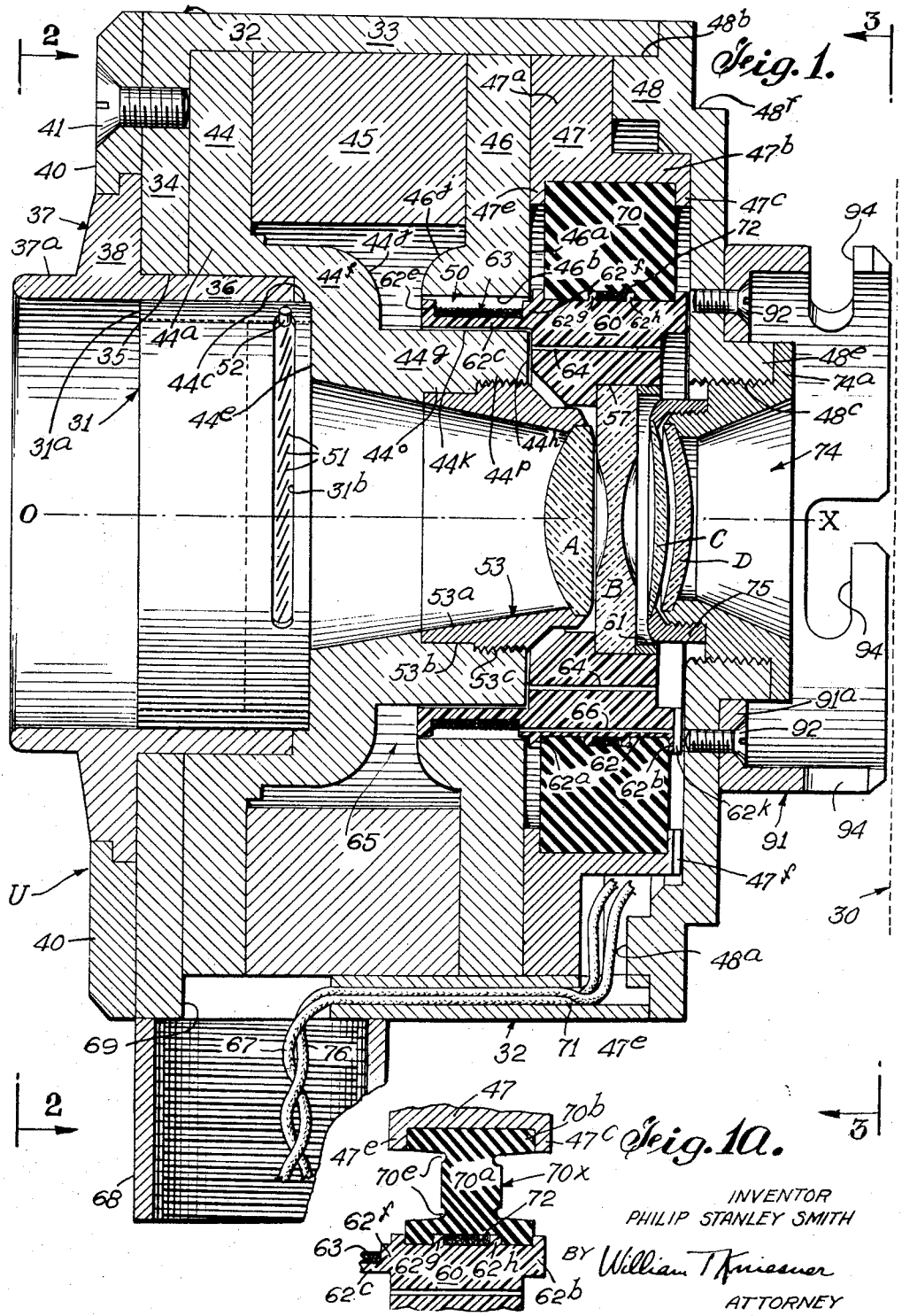
INVENTOR
PHILIP STANLEY SMITH
BY William T Kniesner
ATTORNEY

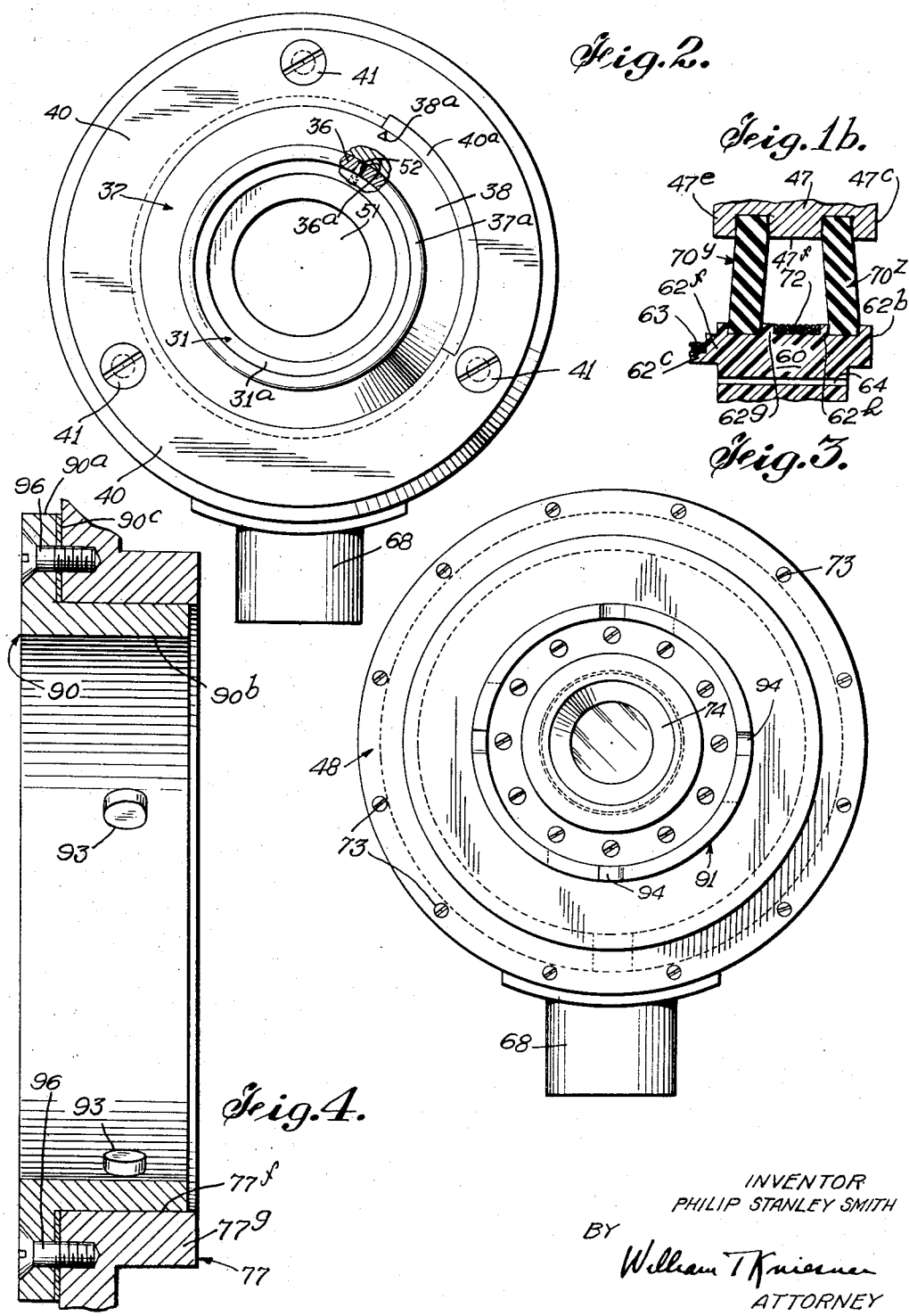

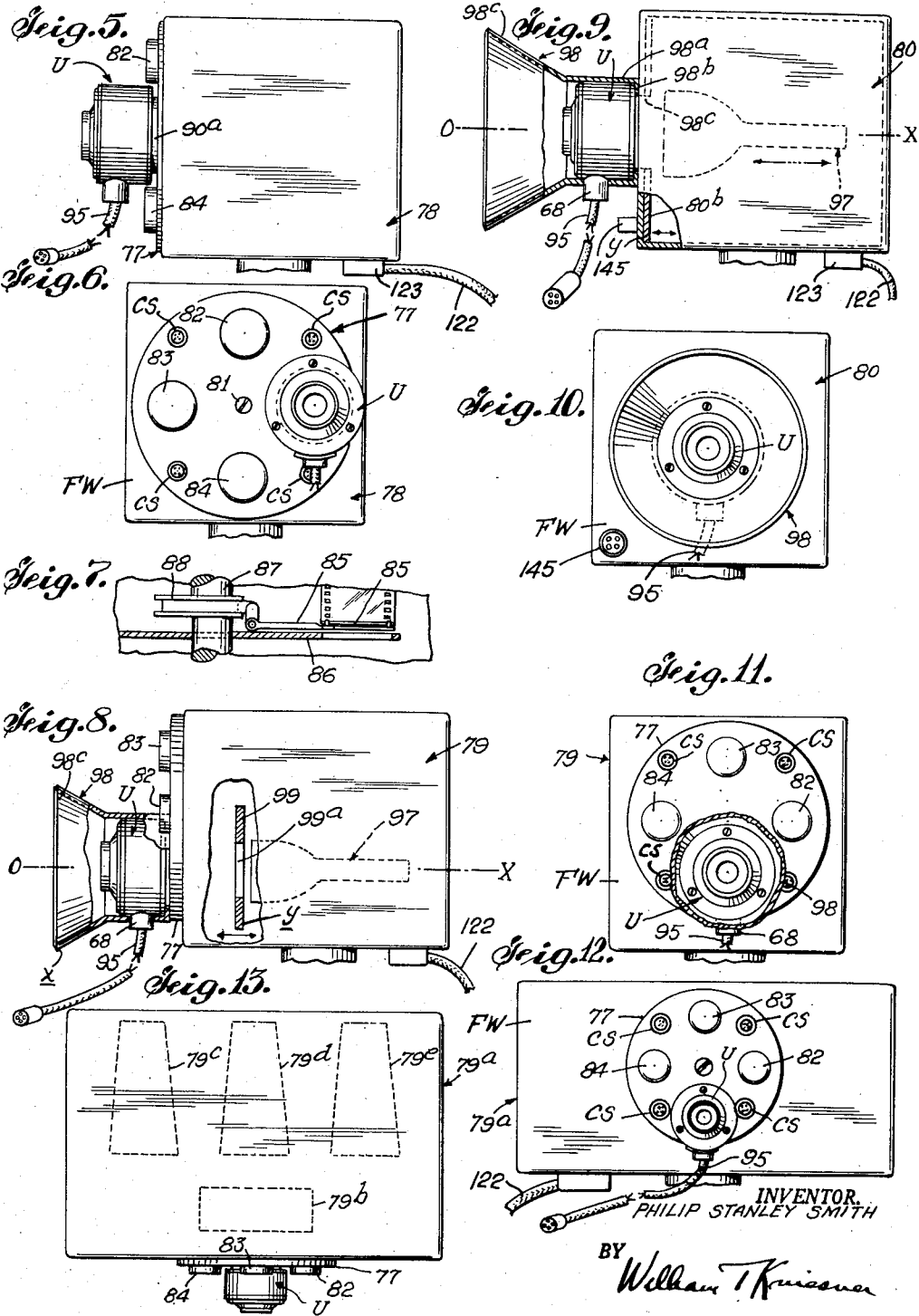

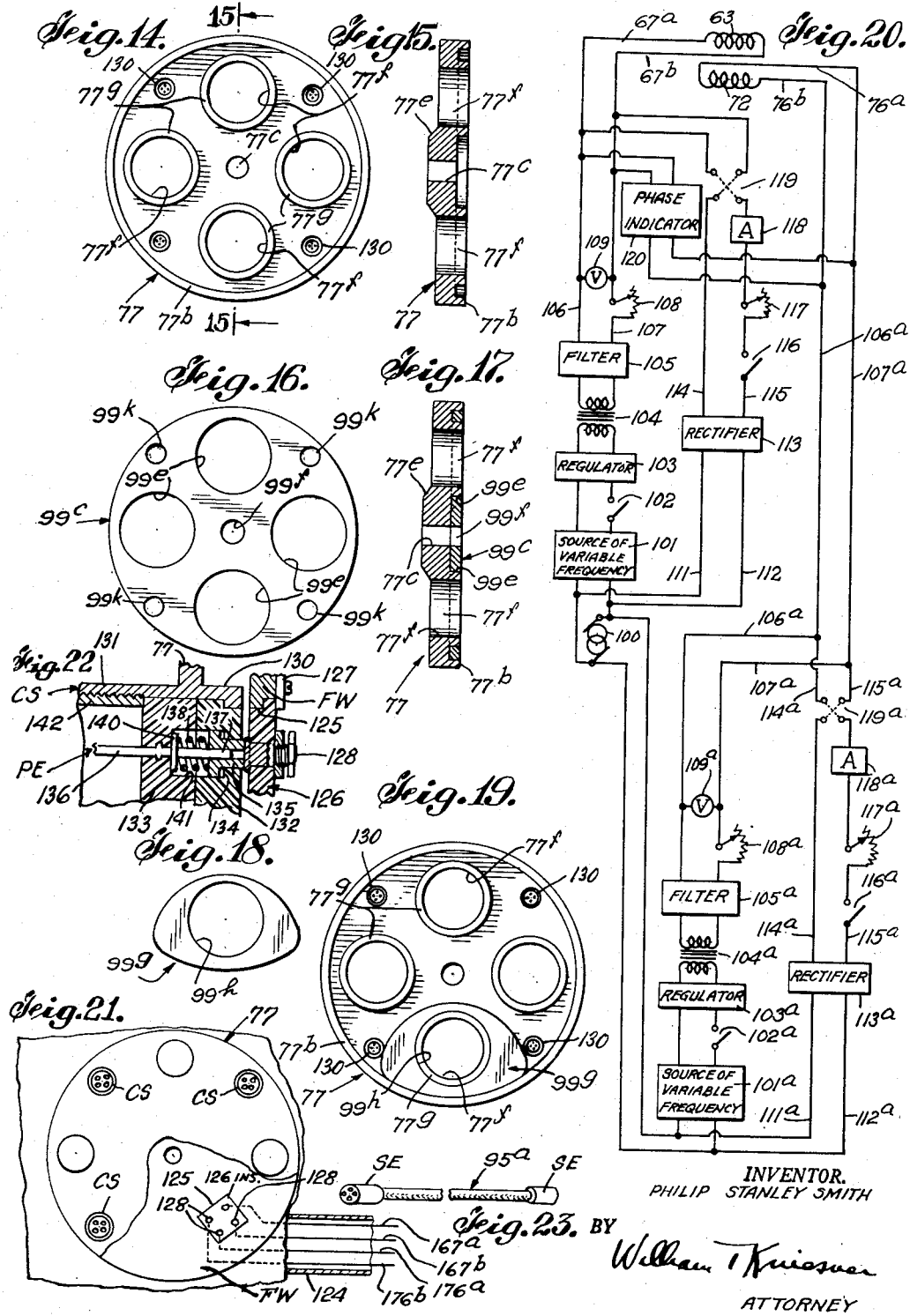

United States Patent Office 2,918,842
Patented Dec. 29, 1959

2,918,842

IMAGE-PRODUCING LENS SYSTEM AND CONTROL

Philip Stanley Smith, Camden, N.J., assignor to Smith-Dieterich Corporation, a corporation of New York Application June 12, 1956, Serial No. 590,995

12 Claims. (Cl. 88—16.6)

This invention relates to an improved construction for a lens unit of the general type described in U.S. Letters Patent No. 2,176,108, issued October 17, 1939, and U.S. Letters Patent No. 2,207,419, issued July 9, 1940.

As described in these patents one or more lenses of the unit is made to move relative to one or more of the remaining lenses in order to change the focus of the unit and obtain a picture giving the impression of depth. The moving lens is mounted in the center of a flexible diaphragm and the diaphragm is flexed by electromagnetic means so that the lens shuttles back and forth along the vertical axis of the lens system of the unit. While this structure for shuttling the lens has opened up new commercial applications for this type of lens system, in practice the flexible diaphragm has not proven entirely satisfactory. The diaphragm is rigidly supported at its edges but there is no control over movement of the body of the diaphragm which is free to flex at will and as a result when the diaphragm is flexed it tends to tilt the lens ever so slightly which destroys sharpness and clarity of image.

The present invention includes an improved mounting structure for such a shuttle lens which so controls the lens throughout its travel that there is no tendency for it to tilt. The lens mounting structure of the present invention comprises a lens mounting member of substantially rigid non-flexible material supported at its outside edges by means of a flexible member which readily yields so that the non-flexible lens mount may be made to shuttle back and forth in the unit. Since the force of the electromagnetic means for driving the lens mount is uniformly distributed over the surface of the mount, there is no tendency for it to tilt and since the mount is made of a substantially rigid non-flexible material, the lens is at all times during travel rigidly held in a plane parallel to the original plane at which it is set in the unit. For best results, the force of the electromagnetic driving means is applied in an annular ring to the surface of the mount and the driving means are preferably made an integral part of the lens mounting member.

Another important feature of the improved construction of the present invention involves certain magnetic shielding devices which are so positioned in the lens unit that they effectively block off and neutralize the magnetic field of the electromagnetic driving means of the unit. Shielding and neutralizing the magnetic field is extremely important in those cases where the camera includes an iconoscope tube for television work and unless special precautions are taken to block off this magnetic field from the iconoscope tube, the picture will be so distorted that it will not be visible for transmission. The magnetic field generated by the electromagnetic driving means includes a unidirectional and an alternating magnetic field. In accordance with the present invention, a portion of this combined magnetic field is blocked off by means of a plate positioned between the iconoscope tube and the electromagnetic driving means of the lens unit. This plate is made of a material of high magnetic permeability and it serves as a flux return feeding the flux back into the casing of the lens unit so that it moves away from the iconoscope tube. The magnetic shielding plate alone is not enough. First of all, the plate is not completely effective in cutting off the alternating magnetic field of the electromagnetic driving means and secondly the plate has an opening in it and a part of the magnetic flux tends to pass through the opening along with reflected light rays of the picture to be transmitted. In accordance with the present invention, this gap in magnetic shielding is blocked off by means of an electromagnetic coil which is so positioned between the iconoscope tube and the electromagnetic driving means that the flux of the coil cuts across the magnetic field of the electromagnetic driving means of the lens unit to effect neutralization of the field.

Other features and advantages of the improved construction of the lens unit of the present invention will become apparent by reference to the accompanying drawings in which—

Figure 1 is a central vertical sectional view, through the optical axis, of a lens unit made in accordance with the present invention;

Figure 1a is a fragmentary central sectional view like that of Figure 1 showing a possible modified form of movable-lens mount;

Figure 1b is a fragmentary central sectional view like that of Figure 1 showing a preferred form of movable-lens mount;

Figure 2 is a front end view, on a smaller scale, as seen from the left and along the line 2—2 of Figure 1;

Figure 3 is a rear end view, on a smaller scale, as seen from the right and along the line 3—3 of Figure 1;

Figure 4 is a detached vertical sectional view of a front lens mounting turret;

Figure 5 is a small-scale side elevation of a photographic camera and lens unit made in accordance with the present invention;

Figure 6 is a front view thereof as seen from the left in Figure 5;

Figure 7 is a detached fragmentary view on a larger scale indicating a shutter and step-by-step film advancing mechanism for the camera of Figures 5 and 6;

Figure 8 is a small-scale side elevation of a television camera and lens unit assembly made in accordance with the present invention;

Figure 9 is a side view of another form of television camera and lens unit assembly;

Figure 10 is an elevation as seen from the left in Fig. 9;

Figure 11 is an elevation as seen from the left in Figure 8;

Figure 12 is a front elevation of a television camera and lens unit assembly made in accordance with the present invention;

Figure 13 is a plan view as seen from the top of Figure 12;

Figure 14 is a rear elevation of a lens turret;

Figure 15 is a vertical cross-section of the lens turret along the line 5—5 of Figure 14;

Figure 16 is an elevation of a stray magnetic flux control member;

Figure 17 is a central sectional view of a lens turret with the flux control member of Figure 16 assembled thereto;

Figure 18 is an elevation of another form of stray flux control member;

Figure 19 is a rear elevation of a lens turret like that of Figure 14 but showing the flux control member of Figure 18 assembled thereto;

Figure 20 is a diagram of an electrical power supply system and controls for the lens system and for other stray flux control elements;

Figure 21 is a front elevation of a turreted camera, certain parts being broken away or omitted and other parts being indicated diagrammatically, showing how certain circuits may be extended to the turret;

Figure 22 is a fragmentary enlarged sectional view through a portion of the turret and camera front wall, illustrating certain disconnectible circuit contacts; and Figure 23 is a small perspective view of a jumper cable.

Similar reference characters refer to similar parts throughout the several views of the drawings.

In Figure 1 of the drawings a lens system comprising four lenses A, B, C and D is illustrated which, as far as structural and optical characteristics are concerned, correspond to the four lenses 230, 231, 232, and 233 respectively of the above-mentioned Patent 2,176,108. The lenses are coaxially aligned along a common optical axis, the space between each lens along the axis may be as defined in that patent, and the movable shuttle lens B may have a range of axial movement commensurate with that mentioned in the aforesaid patent. The shuttle lens in moving changes the focus of the system during each exposure in order to produce at the image plane an infinite number of images of an object. Each image corresponds to a different focus or plane of sharpness and all of the recorded images are of the same size and are registered one on top of the other throughout such change in focus. The change in focus achieved by moving lens B may range from a point close to the camera, for example, three or four feet, to a point infinitely remote from the system or, as is later described, may be any selected portion of that range.

As viewed in Figure 1 of the drawing, the image plane is to the right, at 30, the object to be photographed is to the left. Reflected light coming from the object is controlled by an iris diaphragm which is generally indicated at 31$^b$. Casing 32, for convenience termed the "front case," comprises a cylindrical outer wall 33 and an integral annular front wall 34. The casing is C-shaped in cross-section so that it may be readily machined out of a suitable metal, preferably non-magnetic, such as brass. Front wall 34 has a round hole in it which forms a bearing surface 35 which receives and rotatively holds a sleeve-like flange 36 of annular iris diaphragm control member 37. Control member 37 has an upstanding annular flange 38 which fits snugly against front wall 34 and control member 37 is rotatively held in place by means of ring 40 and screws 41 so that the control member may be rotated by hand.

The members 44, 45 and 46 form a part of the electromagnetic driving means for shuttle lens B. Member 45 is a permanent magnet, preferably made of a material like "Alnico" or "Permalloy." Magnet 45 is in the form of an annular ring with the north and south poles of the magnet positioned at opposite side faces of the ring so that one pole of the magnet is positioned against member 44 and the second pole of the magnet against member 46. The members 44 and 46 serve as pole-pieces for the magnet 45 and they are made of a material of high magnetic permeability, such as soft iron, soft steel, transformer steel, or the like. Pole-pieces 44 and 46 guide the magnetic flux from magnet 45 to an annular air gap 50, for a purpose later described. Casing 32 is made of brass or other non-magnetic metal so that it will not interfere with the magnetic flux of magnet 45. 44 is an annular member having an end piece 44$^a$ which rests against casing wall 34 and the end piece forms an additional bearing surface for flange 36 of the iris diaphragm control member 37. It also has a turned cylindrical surface 44$^c$ of lesser diameter that forms a seat for a stationary ring support member 31$^a$ of the iris diaphragm structure 31. Ring support member 31$^a$ is held in seat 44$^c$ in any convenient way, as by a press fit and the annular face 44$^e$ of pole-piece 44 backs up the inner end of ring member 31$^a$ to fix the position of the diaphragm structure 31 lengthwise of the optical axis O—X. Flange 36 of diaphragm control member 37 is free to rotate about ring member 31$^a$, and the flange has suitable mechanical connections for controlling the diameter of the opening formed by vanes 51. Any suitable form of iris diaphragm leaves 51 and mounting therefor may be employed and Figure 1 illustrates such a known form by means of vanes 51 and a control pin 52 therefor which projects through a 90° slot 31$^b$ in ring member 31$^a$. By shifting pin 52 along the slot 31$^b$ diaphragm vanes 51 are cammed into positions to change the diameter of the opening from a maximum or full opening with the pin 52 at one end of slot 31$^b$ to minimum or zero opening with pin 52 shifted to the other end of slot 31$^b$. Pin 52 also projects up through a slot 36$^a$ in rotatable flange 36 so that the opening of vanes 51 may be controlled by rotating the flange. Flange 36 has a projecting flange portion 37$^a$ which may be knurled to assist hand rotating. As better appears in Figure 2 suitable visible calibrations may be provided on a stationary part as indicated by the arcuate calibration area 40$^a$ on the front face of ring 40, and by a line or arrowhead 38$^a$ on the front face of flange part 38$^a$ which turns through an angle of 90° relative to ring 40. The axis of iris diaphragm control member 37 and its control elements coincides with the optical axis O—X of the lens system comprising lenses A, B, C and D.

Member 44 guides the flux from one pole of magnet 45 to an air gap 50. Member 44 extends inwardly from portion 44$^a$ into the space within the ring magnet 45 and the radius of member 44 becomes progressively smaller and smaller down towards portion 44$^f$ and then member 44 is extended inwardly substantially parallel to axis O—X to form end portion 44$^g$ which terminates in an end annular face 44$^h$ positioned in the same plane with end face 46$^a$ of magnetic pole-piece member 46. The external surface 44$^k$ of portion 44$^g$ is a true cylinder and it forms one boundary of air gap 50. The other boundary is face 46$^b$ of member 46 which is also a true cylindrical surface so that air gap 50 has uniform radial dimension throughout. The parts 44$^k$ and 46$^b$ are also coaxially mounted with respect to axis O—X of the lens system.

The magnetic flux produced by ring magnet 45 is thus guided in a magnetic circuit which includes the mass of the ring magnet 45, the pole-piece member 46 in which the flux flows radially to or from the cylindrical pole-face 46$^b$, the uniformly dimensioned air gap 50, and the other pole-piece 44 in which the flux flows to or from the pole-face 44$^k$ and also through the various portions of member 44.

By extending member 46 into the space within ring magnet 45 as indicated at 46$^j$, there is maintained a long air gap in an axial direction which gives high reluctance and cuts down leakage of flux away from the ring-shaped air gap 50 and this helps to maintain a magnetic flux radially across the air gap which is uniform and of high density.

Referring now to the lenses, lens A is assembled first in the apparatus and then lens B, followed by lenses C and D. Lens A is secured in a suitable annular seat turned in one end of a sleeve-like element or lens mount 53, preferably made of brass which has a tapering or frusto-conical inside surface 53$^a$. The external surface is a stepped cylindrical surface of which one part 53$^b$ is of smaller diameter than the other part 53$^c$, the latter being threaded as shown. Lens mount 53 is carried in portion 44$^g$ of member 44 by means of two internal stepped cylindrical surfaces 44$^o$ and 44$^p$. The latter is threaded to receive the threaded part 53$^c$. The surface shoulders on these parts fix the position of lens A along optical axis O—X and they also hold the axis of lens A in coincidence with the optical axis O—X. The remaining internal surface of part 44$^g$ is provided with the same taper as the taper of the inside surface 53$^a$ of lens mount 53 so that a continuous converging passage of circular cross-section is provided for light rays passing through the opening in the iris diaphragm 51 and into the lens system.

Lens B, which is preferably of larger external diameter than the remaining lenses in that its unground peripheral portions are extended radially outward, fits into a right-angled annular seat 57 in a ring-shaped carrier 60 preferably made of light-weight non-magnetic material which is substantially rigid and non-flexible. Plastic materials which are substantially rigid and non-flexible such as the phenolic, urea, vinyl and polyester resins may be used and excellent results have been achieved with Bakelite. The resins may, of course, include the usual fillers or fabric to give it increased rigidity and strength. The right-angled seat 57 is adapted to hold the axis of lens B on the optical axis O—X of the system, and lens B is held in place by any suitable retaining means, such, as, for example, a retaining ring 61 which may be of metal such as brass and the ring may be press-fitted or otherwise secured in place.

Carrier 60 is preferably made substantially thicker than lens B to give it rigidity and the carrier is mounted in a flexible annular support member 70. Support member 70 is made of resilient material such as rubber and the cross-sectional shape of support 70 may vary. Illustratively, the cross-section may be that of a right-angled parallelogram, such as a square, with its midplane substantially coincident with the midplane of the lens B. Or it may be recessed in one or both of its end faces and, by way of illustration, it may have the cross-section of the letter I, like an I-beam, again with its midplane substantially coincident with midplane of lens B.

Support member 70 may be secured to carrier 60 in any suitable manner. For example, it may initially have a smaller inside diameter than the outside diameter of ring 60, so that it has to be stretched somewhat to put it in place, whereupon its own elasticity or resiliency binds it uniformly in place. Or it might be cemented to the cylindrical surface 62 by any suitable cementing material. Preferably, the ring-shaped carrier 60 is provided with one or more peripheral flanges projecting from the cylindrical surface 62 which ride on either side of support member 70, as is illustrated by the two spaced flanges 62$^a$ and 62$^b$.

Support member 70 is held in concentric relation to casing part 32 by means of a centering ring 47. Member 47 has a ring part 47$^a$ seated against a portion of the side surface of pole-piece 46 and a sleeve-like extension 47$^b$ which carries a flange 47$^c$ that is a companion to a similar flange 47$^e$. Flanges 47$^c$ and 47$^e$ fit snugly against the side surface of the flexible support member 70 and the inner cylindrical surface of member 47 fits snugly against the outer cylindrical surface of flexible support member 70 to form a seat for the support member. The support member is securely anchored in place in its seat by any convenient means.

Member 47 is preferably made of brass or other suitable non-magnetic material so that it does not interfere with the magnetic circuit above described.

The substantially rigid non-flexible ring-shaped lens carrier 60 has as an integral part thereof a cylindrical sleeve 62$^c$ which projects into air gap 50 concentrically with members 46 and 44$^g$. The inside diameter of sleeve 62$^c$ is slightly larger, as by several thousandths of an inch, than the diameter of the cylindrical external surface 44$^k$ of member 44$^g$ so that there will be a small clearance between the sleeve and the cylindrical surface of member 44$^g$. Sleeve 62$^c$ carries a winding 63 of a suitable number of turns of wire, such as copper enameled magnetic wire, preferably uniformly and symmetrically distributed on the surface of the sleeve. Sleeve 62$^c$ has upstanding flanges 62$^e$ and 62$^f$ at either end thereof and the outside diameter of the flanges is slightly less, in the order of several thousandths of an inch, than that of the cylindrical face 46$^b$ of member 46. Centering ring 47 and the flexible support member 70 are adapted to hold the vertical axis of lens B on the optical axis O—X of the system and when this is done, sleeve 62$^c$ is free to slide in air gap 50 without contacting the members at the top and bottom boundary of the air gap.

Lenses C and D are carried in a back plate 48 and as illustrated in the drawings these lenses are mounted in the back plate in conventional fashion. Lens D is carried at the inner end of a mounting ring 74 and lens C is carried in a second mounting ring 75 which is in threaded engagement with the inner end portion of mounting ring 74. Mounting ring 74 has external threads which screw into a threaded base 48$^c$ of an annular flange 48$^e$ of the back plate and mounting ring 74 has a flange 74$^a$ which butts against flange 48$^e$ thereby establishing the desired space relationship between lens A and lenses C and D. The mounting rings 74 and 75 are adapted to hold the axes of lenses C and D respectively on the line of the optical axis O—X of the lens system. Back plate 48 is rabbeted as at 48$^b$ so that it fits into casing 32 against the face of ring 47 as at 47$^b$ and 47$^c$. Screws 73 (see Fig. 3) hold the back in place and back plate 48 in conjunction with front plate 34 securely hold members 44, 45, 46 and 47 in place. Back plate 48 is preferably made of brass.

Referring now to the electromagnetic driving means for lens B, windings 63 are positioned in the relatively strong magnetic flux of permanent magnet 45 in air gap 50 and when the windings are energized with alternating electric current lens carrier 60 and lens B are forced to move back and forth along optical axis O—X of the system. The driving force of windings 63 is applied in an annular ring to the surface of carrier 60 and since the carrier is made of substantially rigid non-flexible material the driving force against the carrier is evenly distributed over its surface. As a result there is no tendency for the carrier to tilt while it shuttles back and forth and the vertical plane of the surface of the carrier and lens remain parallel to the original plane at which they were set in the camera. Cylindrical sleeve 62 with its close tolerances, support member 70 and centering ring 47 all help to maintain the carrier and lens in proper alignment in the camera. In this connection it will be noted that in the preferred form of my invention carrier 60 and flexible mounting 70 are both made of non-magnetic material so that they can operate without interfering with the magnetic field of the electromagnetic driving means of the lens unit. In operation movement of carrier 60 tends to compress air in the casing which could possibly interfere with movement of the carrier. This is prevented by means of suitable holes 64 in the carrier which equalize the air pressure on both sides of the oscillating carrier. The holes are so arranged that air pressure will be uniform on the surface of the carrier.

Lens B, carrier ring 60, rubber member 70 and centering ring 47 form a sub-assembly and the sub-assembly is inserted as a unit into front casing 32 before the back plate is secured on the casing. Lens B of the sub-assembly must be accurately positioned in casing 32 and this may be conveniently done by first mounting the casing in the chuck of a lathe. Winding 63 is then energized which causes the carrier and lens to oscillate and while the carrier oscillates the chuck of the lathe is slowly revolved. By this means any tilt of lens B may be readily spotted and corrected. Tilt is corrected by applying a thin coating of lacquer to the lens mounting surface of rubber 70 to straighten up the lens and this is done until the lens is set in the desired plane in the camera. Lacquer is particularly useful for this purpose because it does not later interfere with resiliency of the rubber and it bonds very well to the rubber surface.

Lens carrier mounting 70 is made of rubber. As used herein the word "rubber" is intended to mean natural rubber and also the synthetic rubbers or elastomers as well as admixtures thereof compounded and cured in suitable manner to give the required resiliency.

Referring now to the electromagnetic driving means, winding 63 may comprise eight layers of thirty turns of No. 27 coated wire with axial width of about 5/16 inch. The axial length of flux gap 50 is of the order of 3/8 inch having a radial thickness of the order of 3/32 inch. The permanent magnet 45 may be Alnico-V which is well known and readily available on the open market and magnet 45 may have an axial width of 5/8 inch and inside and outside diameters of 1¾ inches and 2¾ inches respectively. In the preferred form of invention shown the size of the parts are such that winding 63 always functions within a portion of the flux gap of permanent magnet 45 where the flux density is substantially uniform and since windings 63 are uniformly distributed on sleeve 62$^c$ the windings produce a substantially uniform magnetic field. As a result the driving force that moves carrier 60 is evenly balanced and there is no tendency for the carrier to tilt while it moves in the camera.

A modified form of rubber mounting for the lens carrier is illustrated in Fig. 1$^a$. As there shown the cross section of rubber mounting 70$^x$ is substantially that of the letter "I," and it has a central relatively thick web 70$^a$ with upper and lower annular laterally projecting flanges 70$^b$ and 70$^c$ received in the above described seats of centering ring 47 and carrier 60. This form has the advantage of better mechanical interrelationships with the seats, especially where a lesser axial dimension of the web portion 70$^a$ is desired or may be dictated by the conditions to be met or by the particular characteristics of the material employed. If desired the resiliency of the rubber mounting may be changed. This may be done, for example, by altering the shape of the cross section as by providing one or more annular grooves 70$^e$ in one or both of the side faces of the rubber ring as shown in Figure 1$^a$.

Another modified form of rubber mounting for lens carrier 60 is shown in Figure 1$^b$. As there shown the mounting comprises two rings 70$^y$ and 70$^z$ axially spaced apart to give the advantage of a parallel link connection. The individual rings may be of any desired cross section and they are shown in Figure 1$^b$ as of substantially rectangular cross section. The inner annular ends of the rubber rings 70$^y$ and 70$^z$ are seated against the cylindrical face 62 of the ring carrier 60, between flanges 62$^g$ and 62$^a$ and flanges 62$^h$ and 62$^b$ respectively. The outer annular end faces of the two rubber rings are seated against the cylindrical surface of the centering ring 47 between the flanges 47$^e$ and 47$^c$, and the surface of ring 47 is subdivided by an intermediate relatively thick flange 47$^f$ to form two individual annular recesses or seats for the outer annular portions of the two ring members. This arrangement of multiple yieldable ring supports has the advantage of facilitating better control of movement throughout each stroke of oscillation.

It will be noted that the space between the annular seats formed by flanges 47$^e$, 47$^f$ and 47$^c$ is different than the space between the two annular seats formed in the ring carrier 60. As a result of this arrangement the two rubber rings 70$^y$ and 70$^z$ are slightly distorted and strained so that during oscillation of lens carrier 60, the two rubber elements do not pass through a condition of no strain at the same time and at the time one of them passes through a condition of no strain the other is in a condition of greater strain. As a result movement of lens B is controlled by the rubber rings at all times.

Referring again to the electromagnetic driving means for the lens, the two ends of winding 63 are brought through carrier 60 by means of two small holes, as indicated at 66 in Figure 1, to the right hand end face of the carrier 60, where they are connected, as by soldering, to heavier flexible insulated conductors 67$^a$ and 67$^b$ (Fig. 20) of a two-conductor cable 67 which is connected to one of the separable plug and socket members (not shown) housed in connector adapter 68 which is provided with an arcuate flange by which it is secured to a large threaded hole 69 in the wall 33. A hole 71 forms a passageway between adapter 68, and holes 66.

The lens unit U of Figure 1 is useful in connection with portrait cameras for taking stills, motion picture cameras and television cameras. Lens unit U is effective in bringing reflected light rays having in focus characteristics to the image plane of the unit from objects in a scene regardless of the distance of the object from the camera. Out of focus light rays have no adverse effect on the in focus light rays particularly when the frequency of oscillation of movable lens B is high because the moving lens cuts off light rays from any given point in the scene as it moves and shifts the plane of sharpness of the lens away from such point in the scene.

Figs. 5 and 6 show lens unit U in position on turret 77 of an ordinary motion picture camera 78. Turret 77 is rotatively mounted at the front of camera 78 by means of pin 81 and the turret includes the usual stand by lenses 82, 83 and 84. Referring to Fig. 7 film 85 is guided in conventional fashion step by step into and out of the image plane 30 of lens unit U which is positioned behind shutter 86 of camera 78. Shutter 86 is mounted on a conventional driven shaft 87 which carries a cam 88 for operating the film advancing mechanism.

Lens unit U is detachably mounted on turret 77 of camera 78 by means of an adapter ring 90 (Fig. 4) which is held in position on turret 77 by flange 90$^a$ and screws 96. The position of ring 90 relative to camera 78 may be changed by use of shims 90$^c$. Ring 90 includes a cylindrical sleeve 90$^b$ which fits snugly into the hole of the turret and sleeve 90$^b$ carries pins 93 adapted to fit into L-shaped slots 94 of a connector sleeve 91 (Fig. 1) which is in turn anchored on back plate 48 of lens unit U by means of screws 92. Sleeve 91 of lens unit U fits snugly into sleeve 90$^b$ of camera 78 to hold the lens unit U in place on the front turret plate of camera 78. Lens unit U may be detachably mounted on television cameras by means of a similar turret plate 77 and adapter ring 90 as illustrated in connection with the television camera 80 of Figures 9 and 10. Any other convenient means may be used for securing lens unit U to a camera. Turret 77 and ring 90 are merely described for the purpose of illustration. For example in Fig. 9 lens unit U is attached directly to the front of television camera 80 in fixed position and there is no rotating turret on this camera. In any case the important thing is to so position lens unit U in the camera that image plane 30 of lens unit U coincides with the image plane (film) of the motion picture camera and in the case of a television camera with the light receiving member of the television camera. It is to be noted that image plane 30 of Figure 1 merely illustrates the image plane which is in fact positioned out to the right of plane 30 of Figure 1.

Television cameras are extremely sensitive to magnetic flux and stray flux will distort the picture making transmission impossible. In order to prevent the magnetic flux of the electromagnetic driving means of lens unit U from reaching the iconoscope tube of a television camera magnetic shielding means have been devised to cut off and neutralize the magnetic field of lens unit U so that it can not reach the tube of the television camera. This is done by making back plate 48 of lens unit C of a material having high magnetic permeability such as steel so that it serves as a barrier to absorb magnetic flux of the lens unit and feed it back into the casing away from the television camera. A steel back plate is quite effective in blocking off the stray flux of permanent magnet 45 but it is not completely effective in blocking off the stray alternating magnetic flux of windings 63. Further, mounting rings 74 and 75 have a central opening in them for reflected light rays and some of the combined flux of magnet 45 and windings 63 pass through the opening along with the light rays. Effective blocking of the combined alternating and unidirectional magnetic flux of lens unit U is achieved by means of a winding 72 (Fig. 1) positioned around lens carrier 60 between the electromagnetic driving force of lens unit U and the iconoscope tube of the television camera. Alternating electric current (later described) is supplied to winding 72 at the same frequency as that supplied to winding 63 but the current to winding 72 is out of phase with that of winding 63 and as a result the magnetic field of winding 72 effectively cuts off the alternating stray flux of winding 62 as well as the unidirectional flux of permanent magnet 45. Depending upon conditions of use the magnetic flux of winding 72 may be enough to completely cut off the flux of the electromagnetic driving means of lens unit U and in such case there is no need for additional shielding.

If desired added protection against stray magnetic flux may be achieved by positioning a steel plate in the television camera itself in front of the iconoscope tube where it cuts across the magnetic axis of the tube. Referring to Figure 8, 79 is the television camera, 97 the tube and 99 the magnetic shielding plate which is positioned across the path of the reflected light rays that enter the television camera. Plate 99 of course has an opening 99$^a$ so that the light rays can pass through the plate to the television tube. In Figures 9 and 10 another form of magnetic shielding plate is shown in television camera 80. In this case the magnetic shield 80$^b$ is positioned against the front wall of the casing of television camera 80. Magnetic shield 80$^b$ may be made of steel and it has the usual opening 98$^c$ for reflected light rays. Another form of magnetic shield is illustrated in Figure 9. As there shown the magnetic shield comprises a funnel like member 98. As shown in the drawings lens unit U fits snugly inside member 98 and is held in place on the lens unit by means of an annular flange 98$^b$ which fits against the annular external rabbet 48$^f$ (Fig. 1) of back plate 48. Member 98 may be made of steel while the casing for lens unit U is made of non-magnetic brass.

Figures 12 and 13 diagrammatically show a television camera 79$^a$ of a type in which the scanning is done by a spot of light and the electronic tube or tubes are more remotely spaced from the image plane of the lens system or, as in color television where, at the image plane, suitable devices indicated diagrammatically at 79$^b$ in Figure 13 optically break up the light into several color components, usually three, which in turn are made to coact with electronic or electro-optical tubes or the like. For example, the system at 79$^b$ can split the light received at the image plane into three color components which in known manner are transmitted by the three electronic devices at 79$^c$, 79$^d$, and 79$^e$. The camera is provided with a lens turret 77 the same as above described in connection with Figures 5, 6 and 8. This turret 77 may be of standard construction and its principal structural features are substantially as shown in Figures 14 and 15.

The turret 77 may be a duraluminum disc, which has a plate-like circular wall surrounded by a peripheral flange 77$^b$ which is concentric with the axis of the central hole 77$^c$ through which extends the screw 81 (Figs. 6, 11 and 12) by which the turret is rotatively supported by the camera casing structure. The wall of the latter has a circular opening into which the peripheral flange 77$^b$ extends with enough clearance to insure unobstructed rotary movement of the turret. The hole 77$^c$ is formed in a centrally thickened portion 77$^e$ (Fig. 15) of the plate which forms a hub.

The turret face plate part 77$^a$ has four round holes 77$^f$ each of which is surrounded, at the inner side of the face plate part 77$^a$, by an annular collar-like flange 77$^g$ which is faced off to fall in the same plane with the plane of the edge of the peripheral flange 77$^b$, as best appears in Figure 15. These four holes carry various types of lens systems as indicated at 82, 83 and 84 in Figures 6, 8, 11 and 12, with lens control unit U assembled in one of them in the manner described above in connection with Figures 1 and 4. In Figure 4 any one of these holes 77$^f$, with its flange or collar 77$^g$, is shown on a larger scale, with adapter ring 90 assembled thereto for receiving the connector sleeve element 91 (Fig. 1) of the lens control unit.

With turret plate 77 so constructed a circular flux barrier plate 99$^c$ may be provided. As shown in Figure 16 it has a diameter slightly less than the inside diameter of the turret plate peripheral flange 77$^b$ so that it can be snugly received within the flange 77$^b$ and brought to rest against the face plate part 77$^a$. Plate 99$^c$ has four equi-angularly spaced holes 99$^e$ of a diameter to neatly receive therethrough the flange-like parts 77$^g$ of the four holes 77$^f$ in the turret plate; it also has a central hole 99$^f$ that is in alignment with the hole 77$^c$ in the hub of turret 77, for the passage therethrough of the supporting stud screw 81.

Another form of magnetic shield is shown in Figures 18 and 19. As there shown shield 99$^g$ is constructed to be individually adaptable to any one of the turret holes at which the lens unit U is to be secured. Member 99$^g$ has a hole 99$^h$ which receives the flange-like part 77$^g$ of the selected one of the four holes 77$^f$ in the turret plate. In so interfitting these parts, the member 99$^g$ is held coaxially with the axis of the selected hole 77$^f$ with which the optical axis O—X is coincident. Plate member 99$^g$, like the member 99$^c$ of Figures 16 and 17, is preferably of a thickness just about equal to the depth of the space provided in the rear of the turret by the peripheral flange 77$^b$.

Winding 72 is most conveniently positioned on non-magnetic carrier 60 (Figs. 1, 1$^a$ and 1$^b$) and its ends may be carried, through a separate hole or through the same hole 66 that carries the ends of winding 63, the four terminals being brought out of the channel 66 and then along a suitable side slot 62$^k$ (Fig. 1) in the carrier 60, from which they extend radially (downwardly in Fig. 1) alongside of member 70 and along a radial slot 47$^b$ in the centering ring 47 into the space provided by the large slot 48$^a$ in the back plate 48. Slot 48$^a$ provides a large enough space wherein the ends of winding 63 may be connected to the wires 67$^a$ and 67$^b$ of two-conductor cable 67 and the ends of winding 72 connected to the wires 76$^a$ and 76$^b$ of the two-conductor cable 76. The four wires of cables 67 and 76 (Fig. 20) are connected to the plug and socket element (not shown) secured in the part 68 which receives its power from a four-conductor cable 95 (Fig. 5).

Winding 72 is energized from a suitable source by current of the same characteristics that energizes motivating winding 63 but the two currents are out of phase. As a result the magnetic field set up by winding 72 opposes the magnetic field set up by winding 63 so that stray flux of windings 63 is substantially neutralized by the flux of windings 72.

If the energization of winding 63 is increased or decreased by external controls later described or the frequency or direction of the energizing current changed, compensating changes are made in the energizing current of neutralizing winding 72 and its neutralizing action is maintained. As is later described, energization of winding 63 by pulsating or alternating current may also be accompanied by energization with unidirectional continuous current, and in such case winding 72 is similarly and in corresponding but opposed degree so energized, producing opposing or neutralizing magnetic fields substantially matching the characteristics of the corresponding stray fields from winding 63.

In Figure 20 I have diagrammatically indicated a circuit arrangement for energizing the lens-moving winding 63 and also the stray-field control winding 72. In Figure 20 the two windings are indicated diagrammatically at 63 and 72 and are connected to respective circuits which may be identical but are controlled interdependently. At 100 is indicated a suitable source of electrical energy, preferably alternating current, which is preferably of a voltage and frequency such as are in common use. I arrange to energize winding 63 selectively with alternating current energy or direct current energy, and at times with both, and I also provide means for selectively changing the frequency at which winding 63 is to be energized. A similar provision is made for energizing winding 72 and for providing proper phase relationship between the two.

Considering first the supply and control circuit for winding 63, from the source 100, conductors lead to a conventional frequency changer 101 which is provided with suitable means for manually varying or changing the frequency at its output terminals. From thence, conductors lead through a switch 102 to a voltage regulator 103 and thence by way of a step-down transformer 104 to a filter 105, and thence by way of conductors 106—107, through a rheostat 108, to two of the conductors of cable 95 that pass to the lens unit U (Figs. 5, 8, 9, 11 and 12) and then through conductors 67ª and 67ᵇ to the winding 63 internally of the unit as above described. Suitable instruments to indicate the A.C. energization of the winding 63 are provided and they may be typified by a voltmeter 109. In this illustrative manner the winding 63 may be energized with alternating current at the desired frequency and energy input.

From the source 100 conductors 111—112 lead to a rectifier unit, indicated at 113, which may be of any suitable type, such as a full-wave rectifier, and preferably also includes means, such as input step-down transformer for bringing the voltage of the direct current supply to the winding 63 within the desired range, and selectable at will in value. From the rectifier unit 113 the circuit leads to the same two wires of the cable 95 that make connection with the wires 67ª and 67ᵇ (Fig. 1) inside the unit, but in the circuit of conductors 114—115 there is included a switch 116, a rheostat 117, an ammeter 118, and a reversing switch 119; by means of the latter, the direction of D.C. energization of the turns of winding 63 is selectable or reversible at will, in relation to the unidirectional magnetic flux in gap 50 (Fig. 1) of the permanent magnet 45.

An identical supply and control circuit is provided for winding 72 and the parts thereof that are similar to the circuit for winding 63 are indicated by the same reference characters modified by the suffix "a." This circuit is connected, as shown, to the source 100, at one end; its A.C. output end is connected by conductors 114ª and 115ª, to the other two wires of cable 95 which extend the circuit to wires 76ª and 76ᵇ internally of unit U to winding 72 as above described. In this manner, the two windings 63 and 72 may be energized by controllable values and characteristics of electrical energy, controllable as to each winding in relation to each other. The two supply and control circuits are furthermore controllable in any suitable manner, to supply to the two windings energy of the same periodicity but the current supplied to winding 72 is out of phase with the current supplied to winding 63 so that the two magnetic fields will oppose and neutralize each other. The power units 101 and 101ª have appropriate controls to determine or set the frequency of output and to determine or set one or both so that any desired phase displacement between their outputs may be achieved. Any suitable form of phase indicator, such as an appropriate oscilloscope, diagrammatically indicated at 120 in Figure 20, is connected to the two A.C. output circuits 106—107 and 106ª—107ª to indicate phase relationship of energization of windings 63 and 72.

For example, power units 101 and 101ª may comprise, in simplest form, two coaxial alternators driven at the same speed, as by the same source of driving power, with means for shifting one rotor with its poles rotatively relative to the other to provide the desired phase angle. Or the power units 101 and 101ª may be in the form of electronic power-packs, utilizing oscillating tube circuits controllable, in known manner, to each produce any selected frequency of A.C. within the desired range and phase relationship one to the other.

Across the air gap 50 (Fig. 1) there exists continuously unidirectional high-density magnetic flux or field from the permanent magnet 45, and lens winding 63, energized by alternating current of suitable value and frequency, produces in that flux gap 50 an alternating magnetic flux or field, the intensity and polarity of which follows very closely the changes and direction of the instantaneous value of the energizing alternating current, reacting with and against the high-intensity permanent magnet flux to set up synchronously reversing forces in an axial direction, causing corresponding axial reciprocation of the winding 63 itself and with it its spool 62 and lens carrier 60 in which lens B is mounted, the rubber ring support 70 yielding in axial direction and uniformly throughout its annular cross section.

As a result lens B is caused to oscillate to change the focus of the lens system while maintaining constancy of size of image at the image plane 30. In the illustrative form of lens system with lens B movable relative to lenses A, C and D as described in the above mentioned Patent No. 2,176,108, movement of lens B to the right as seen in Figure 1 shifts the focus or plane of sharpness from a point close to the camera, say, on the order of about four feet, to a distance far remote from the camera, and theoretically to infinity, but at the image plane 30, during such a stroke of movement, the lens system produces an infinite number of images of the scene or object, all of which images are of the same size and in registry throughout, even though they correspond to respectively different foci or planes of sharpness; on the reverse stroke the focus is changed in reverse manner and the plane of sharpness progressively shifted from the remote distance to a point again close to the camera, always with the production of the same size of image and registry of images of the scene or object, at the image plane. If there is a film at the image plane, such as the film 85 of Figures 5–7, these registering images are recorded on the film; if the lens unit is related to a television camera as above described, the unique light ray effects at the image plane as earlier above described coact with the light-sensitive screen, or light-scanning device, or other means or devices, in the manner and with the unique advantage above set forth. Any suitable frequency of lens oscillation may be employed, and in the above mentioned patent a wide range of frequencies is set forth; the source of variable frequency 101 (Fig. 20) is simply set or adjusted to produce the selected frequency of alternating current for energizing the winding 63. For purposes of illustration, excellent results have been achieved at a frequency of 120 cycles per second, particularly for motion picture photography, utilizing a shutter as diagrammatically indicated in Fig. 7, with the film advanced at a standard rate, illustratively 24 frames per second. For still photography, where the film or plate or other light-sensitive element is exposed momentarily, any desired number of lens oscillations per time of exposure may be achieved by simply selecting the frequency of the alternating energizing current in relation to the intended exposure time.

As above described, winding 63 is also energizable by direct current derived in the illustrative system of Figure 10 through a rectifier unit 113. By energizing winding 63 by direct current, a steady unidirectional magnetic field is set up by the winding 63 and that magnetic field coacts with the intense field produced by the permanent magnet 45 in flux gap 50 to exert uniformly distributed, axially directed force upon the lens carrier 60, the rubber centering ring 70 yielding thereunder, thus effecting and maintaining an axial displacement of the lens B relative to the other lenses, the amount of displacement being a function of the direct current energization and the axial direction of the displacement being either to the right or to the left as viewed in Figure 1, according to the direction in which the winding 63 is energized from the direct current source which is controlled by the reversing switch 119 of Figure 20. The super-imposed alternating current energization of winding 63 at any selected frequency causes the winding 63 also to produce a corresponding alternating current magnetic field which coacts with the intense permanent magnet field in the flux gap 50 to effect lens oscillation as earlier above described, the reciprocatory or oscillating stroke of the lens B is shifted along the optical axis O—X by an amount determined by the D.C. energization of winding 63, while the length of the oscillating stroke is still variable according to the amount of alternating current supplied to the winding 63. In this manner quick selection of any portion of a range of change of focus from a point close to the camera to an infinitely remote point may be made. For example, an indoor scene is of small depth compared to an outdoor scene, and by the just described arrangement a stroke of movement of lens B may be selected to sweep the plane of sharpness or focus of the camera only throughout that relatively small depth of indoor scene. For an outdoor scene of great distance or depth, in which both foreground and remote background are to be covered, the D.C. energization is reduced or made zero and the lens B is made to partake of its full range of movement, thus to sweep the plane of sharpness or focus from a point near the camera to a point vastly remote and back again. If an outdoor far distant scene is to be covered, with little or no close or foreground objects, the D.C. energization is selected so that the lens B is so displaced that under the A.C. energization the plane of sharpness or focus is shifted back and forth between a point distant from the camera and the most remote point in the scene. The various control and energizing apparatus diagrammatically indicated in Figure 20, all of which can be compacted into a convenient portable unit or panel, can have its various manual controls calibrated in any suitable manner to quickly set values of frequency, alternating current, and direct current to meet a wide variety of conditions to be met in practice, as well as of effects to obtain; the iris diaphragm 51 (Fig. 1), shown in the illustrative embodiment as manually adjustable by rotatively setting the knurled diaphragm ring 37, can be correspondingly calibrated in conjunction with the calibration of the principal electrical control.

Lens unit U may be operated at low power input. By way of illustration, excellent results have been achieved by energizing the winding 63 at an A.C. voltage of about three volts at a frequency within the range of about 60 cycles to 180 cycles per second, with a D.C. energization of the winding 63 on the order of 0.3 ampere, variable in up and down direction, of course, according to the selected action and control of the lens system. These electrical energy input values are set forth by way of illustration and are not to be interpreted in a limiting sense.

As to phase relationship of current supplied to windings 63 and 72, the phase displacement may be within the range of about 120° to 240°. Excellent results have been achieved with a phase displacement of 180° where winding 72 has 170 turns (10 layers of 17 turns each) of the same size of wire as against the above described 240 turns for winding 63, with winding 72 energized at a voltage just about one-half that applied to winding 63. Thus where winding 63 has a voltage of 3.00 applied to it, winding 72 with phase-displaced applied potential as above noted, neutralizes stray flux effectively at an applied voltage of 1.60. For another illustrative condition, these respective voltages may be 5.80 and 3.40. These figures are illustrative only; their order of magnitude changes as other factors are changed.

If desired the electric cable 122 for the camera may be used for supplying power to lens unit U by putting four extra conductors in the cable. Cable 122 (Figs. 5–12) enters the camera casing, for example, by way of a suitable cable entry and distributor box diagrammatically indicated at 123. Within the camera casing the conductors are suitably distributed, in known manner, to complete the circuits and connections to their respective camera devices. The four extra conductors of cable 122 that are to be in the circuit of the lens unit windings 63 and 72 are extended within the camera casing to a suitable point at the front wall FW of the camera casing and suitably shielded. In Figure 21 these four conductors are diagrammatically indicated at 167$^a$—167$^b$ and 176$^a$—176$^b$ and the shielding therefor, such as a metal conduit or sheath, is indicated at 124. The conductors and sheathing extend along the inside face of front wall FW (Fig. 21) to a point underlying the turret 77 of Figures 5–6, 8 and 11–13 close to the circular periphery of the turret and halfway between the 3 o'clock and 6 o'clock point on the turret as the latter is seen in Figures 6, 11 and 12. At that point in the front wall FW the latter has a rabbetted aperture 125 (Figs. 21 and 22) in which is set a block 126 of insulating material as secured in place in any suitable way as by a peripheral frame 127 indicated in Figure 22. The insulating block 126 has four contact studs 128 extending through it, thus presenting underneath the turret 77 and within the peripheral flange 77$^b$ thereof four contact elements formed by the heads of the contact bolts 128 (see Fig. 22). The inner ends of these contact elements 128 are provided with any suitable means for connecting the four shielded conductors 167$^a$—167$^b$ and 176$^a$—176$^b$ thereto and such means may comprise a clamping nut, soldering lug, or the like. In this manner the circuits of these four cable conductors are extended to the front face of the front wall FW, underneath rotatable turret 77.

As above described, turret 77 (see also Figs. 14–19) has four flanged openings for mounting four different lens systems therein, one or more of which may comprise the lens unit U. In between these four lens mounting locations and relatively close to the periphery of the turret 77 are provided relatively small round internally and externally flanged connecter seats CS, the centers of all of them being on the same radius from the axis of turret 77 as the radial distance from that axis to the center of the insulating contact block 126 (Fig. 21). Each connector seat carries four plug prong contact elements each generally indicated by the reference character PE, being grouped and spaced from each other in the same manner as are the four contacts 128 of the insulating block 126. These elements PE present four prongs in a direction forwardly of the turret 77 for coaction with the four socket contacts of a socket member at the end of a cable and each presents a spring-biased contact rearwardly of the turret, being spring-biased in a direction toward the face of front wall FW and being engageable respectively with the four contacts 128 of the insulating block 126 (Fig. 21).

Each connector seat CS may have at the inside face of the turret 77 an annular internally shouldered sleeve or flange 130 that falls just short of engaging with the front wall FW, and on the outside face of the turret it has an annular flange 131. Into the resultant internally cylindrical structure are seated two externally cylindrical insulating blocks 132 and 133 which insulatingly carry the four plug connector elements PE distributed, as above described, about the axis of the sleeve 130—131. At each of these four distributed points the member 132 has molded into it a shouldered round hole 134 in which is slidably received a shouldered and centrally apertured contact 135 which is projectible to the right in Figure 22 to an extent permitted by the respective shoulders just mentioned. At each of these four distributed points the insulating block 133 has molded or otherwise anchored to it a round contact prong 136 that has a shank 137 that has a spring 138 about it and that extend into the aperture of the slidable contact 135 so that the two are in electrical contact with each other and the contact 135 can also slide along the stem 137. Spring 138 abuts against contact 135 and biases it to the right and at its other end it abuts against a disc-like shoulder 140 formed integrally with the stem 137, the spring thus forming also an additional electrical connection between the contact 135 and the prong 136. The insulating block 133 has a recess 141 on its inside face mating with the recess 134 in the companion insulating block 132. The two blocks are anchored in the sleeve-like connecter seat CS in any suitable way as, for example, by a clamping ring 142 threaded into the outer annular flange 131 to clamp the insulating blocks together and against the internal shoulder of the rear annular flange 130.

Accordingly, when the turret 77 is rotatively shifted to position the lens unit U to the selected position, illustratively a 3 o'clock position as in Figure 6 or a 6 o'clock position as in Figures 11 and 12, one of the four connector seats CS of the turret becomes positioned at a point halfway between the 3 o'clock and 6 o'clock positions and its four spring-biased inside contacts 135 are brought into good electrical engagement with the four contacts 128 of the insulating block 126 (Fig. 21) in the front face FW, that block 126 with its four contacts being fixedly positioned at a point halfway between the 3 o'clock and 6 o'clock locations, and thus the circuit of the four shielded conductors is extended to the four plug prongs PE that is thus brought to the critical rotary position of the turret 77. Thereupon, instead of using a long cable, a short cable indicated at 95ª in Figure 23 is employed with one of its socket elements SE semi-permanently fixed in the connector housing 68 (Fig. 1) of the lens unit and its other four contact socket elements SE is then plugged into that connector seat CS that has been brought to the selected or critical rotary location as above described, this socket element taking over the four prong elements PE and thus extending the circuit to the two-conductor cables 67 and 76 (Fig. 1) inside the lens unit U and which lead to the lens unit windings 63 and 72 as earlier above described. This short cable 95ª (Fig. 23), which need be only 8 or 10 inches long, is preferably a shielded cable of any suitable construction. Where a stray flux barrier member is inserted at the rear of the entire turret 77 like the member 99 of Figures 14-17, it is provided with four suitably distributed holes 99k (Fig. 16) of a diameter to just receive therethrough the rear annular flanges 130 of the four sleeve-like connector seating devices CS. Where a stray flux barrier member like the member 99g of Figures 18-19 is employed, it will be seen that its configuration can be such as to be received in the space between any two successive internal or rear flanges 130.

Where it is desired to achieve the advantages of such a short shielded jumper cable and the advantages of embodying the conductors of the circuit of the lens unit windings with the conductors of the shielded cable 122 in a camera in which the turret is not employed, as in the camera of Figures 9-10, the four internally shielded conductors 167ª—167ᵇ and 176ª—176ᵇ may be brought to a suitable wall of the casing of camera 80 of Figures 9-10, such as the front wall FW, and there internally connected to a shielded four-pronged coupling connector indicated at 145, as shown in Figures 9-10, for the reception of one of the socket elements SE of the short jumper cable 95ª of Figure 23, the other socket element SE being semi-permanently connected and attached to the part 68 of the lens unit U, as earlier above described.

It will thus be seen that there has been produced in this invention a lens system of axially relatively movable lenses and a mounting and actuating system therefor, with the lenses corrected to produce equality of size and registry of in-focus and out-of-focus images, at the image plane of the lens system, of a scene or object corresponding to changes in focus of the lens system and correspondingly different planes of sharpness, in which the various objects together with many thoroughly practical advantages are successfully achieved.

Obviously various changes could be made in the described structure without departing from the spirit of the invention or the scope of the accompanying claims, and certain of the novel features of the invention could be usefully employed in other types of lens systems. For example, the described mounting means for the movable lens of the present system which permits axial movement of the lens while avoiding tilting thereof could be advantageously employed irrespective of whether the movable lens is a simple or a compound lens and irrespective of whether or not the lens is one element of a lens system of the type described in the said issued patents.

This application is a continuation-in-part of my copending application, Serial No. 284,008, filed April 24, 1952, and entitled "Image Producing Lens System and Control," now abandoned.

What I claim is:

1. The combination with an optical lens of mounting means therefor comprising an annular substantially rigid mount secured about the periphery of the lens, an annular member of flexible material encircling and holding said mount, an outer fixed rigid annular member positioned about and holding the outer periphery of said flexible member, means including a permanent magnet and magnetically permeable means for defining an annular air gap coaxial with the lens and for creating a radial magnetic flux across said air gap, said annular mount having a sleeve portion that extends into said air gap, a winding on said sleeve portion which, when energized, cooperates with the radial flux from said magnet to provide electromagnetic axial driving means for said lens, said annular member flexing to permit said axial movement of the lens.

2. The combination according to claim 1 including a casing for said lens and lens mounting means and shielding means for confining within the casing the magnetic flux from said winding and permanent magnet.

3. The combination according to claim 2 wherein said magnetic shielding means includes a second winding on said rigid mount spaced from the annular air gap and when energized providing a magnetic flux in opposition to stray flux of the electromagnetic driving means.

4. The combination as specified in claim 2 in which the casing is made of a non-magnetic metal and in which the magnetic shielding means include a back plate for the casing made of steel.

5. The combination as specified in claim 4 in which the magnetic shielding means further includes a funnel-like steel sleeve adapted to receive and hold the casing therein.

6. In a device of the type described having a lens unit with a plurality of lenses of which at least one is adapted to move along the optical axis of the plurality of lenses to change the focus of the unit, the improvement which comprises an annular member of flexible resilient material, means rigidly holding the outer periphery thereof against movement, a substantially rigid cylindrical member secured about its outer periphery to the inner periphery of said annular member, means for mounting said movable lens within said cylindrical member, a fixed permanent magnet and magnetically permeable means associated therewith and having opposed surfaces providing an annular air gap coaxial with said lens and cylindrical member, said magnetically permeable means conducting the flux from each pole of the magnet to said surfaces whereby there is a radial magnetic flux in said air gap, said cylindrical member having a rigid sleeve portion that extends into the radial magnetic flux in said air gap, and a winding on said sleeve portion adapted when energized to create in conjunction with the magnetic flux from said magnet a force for moving said cylindrical member and lens mounted therein in the direction of their common axes.

7. A device according to claim 6 including means positioned on the side of said cylindrical member remote from said sleeve for generating a magnetic flux in opposition to stray flux from said winding and said permanent magnet to block off such stray flux and thereby provide magnetic shielding for the corresponding end of the device.

8. A structure as specified in claim 6 in which grooves are cut into the body of the annular resilient member to control its resilient characteristics.

9. A structure as specified in claim 6 in which the resilient member is made of rubber.

10. A structure as specified in claim 6 in which the annular resilient member in cross section has the form of an I-beam.

11. A structure as specified in claim 6 in which the annular member of flexible material for mounting the non-flexible cylindrical lens mounting member includes two spaced annular rubber members, each of which is attached to the outside surface of said cylindrical lens mounting member.

12. A structure as specified in claim 11 in which the space between said two annular rubber members at the surface of the cylindrical lens mounting member is different than the space between said rubber members at the outside circumference thereof, whereby the rubber members are given an internal tension.

References Cited in the file of this patent

UNITED STATES PATENTS

| | | |
|---|---|---|
| 2,176,108 | Smith | Oct. 17, 1939 |
| 2,207,419 | Smith | July 9, 1940 |
| 2,517,807 | Sziklai | Aug. 8, 1950 |

FOREIGN PATENTS

| | | |
|---|---|---|
| 481,944 | Great Britain | Mar. 18, 1938 |